United States Patent
Kimura et al.

(10) Patent No.: US 10,759,016 B2
(45) Date of Patent: Sep. 1, 2020

(54) MACHINE TOOL PROVIDED WITH CAMERA FOR CAPTURING IMAGE OF TOOL INTERIOR

(71) Applicant: DMG MORI CO., LTD., Nara (JP)

(72) Inventors: Yuki Kimura, Nara (JP); Shigetsugu Sakai, Nara (JP)

(73) Assignee: DMG MORI CO., LTD., Nara (JP)

( * ) Notice: Subject to any disclaimer, the term of this patent is extended or adjusted under 35 U.S.C. 154(b) by 43 days.

(21) Appl. No.: 15/440,708

(22) Filed: Feb. 23, 2017

(65) Prior Publication Data

US 2017/0259389 A1    Sep. 14, 2017

(30) Foreign Application Priority Data

Mar. 10, 2016 (JP) ................. 2016-046543

(51) Int. Cl.
- *B23Q 17/24* (2006.01)
- *B23Q 11/08* (2006.01)
- *H04N 5/225* (2006.01)
- *H04N 5/232* (2006.01)
- *H04N 7/18* (2006.01)

(52) U.S. Cl.
CPC ...... *B23Q 17/2409* (2013.01); *B23Q 11/0891* (2013.01); *H04N 5/2252* (2013.01); *H04N 5/23296* (2013.01); *H04N 7/185* (2013.01)

(58) Field of Classification Search
CPC ............ B23Q 11/0891; B23Q 17/2409; H04N 5/2251; H04N 5/2252; H04N 5/2253; H04N 5/2254; H04N 5/2257; H04N 2005/2255

See application file for complete search history.

(56) References Cited

U.S. PATENT DOCUMENTS

| | | | |
|---|---|---|---|
| 2011/0039670 A1* | 2/2011 | Honegger | B23Q 1/012 483/56 |
| 2012/0113253 A1* | 5/2012 | Slater | H04N 7/185 348/143 |
| 2017/0129039 A1* | 5/2017 | Williams | B23K 7/102 |

(Continued)

FOREIGN PATENT DOCUMENTS

| | | |
|---|---|---|
| DE | 3532362 A1 | 3/1987 |
| DE | 202014102322 U1 | 8/2014 |
| EP | 1932618 A1 | 6/2008 |

(Continued)

OTHER PUBLICATIONS

International Search Report for related European Application No. 17159705.7; report dated Jul. 18, 2017.

*Primary Examiner* — Francis Geroleo
*Assistant Examiner* — Christopher Kingsbury Glover
(74) *Attorney, Agent, or Firm* — Miller, Matthias & Hull LLP

(57) ABSTRACT

A machine tool includes a cover body for separating at least a machining area from the outside. The cover body has an opening for allowing the machining area to communicate with the outside and includes a door for opening and closing the opening. The cover body does not include a transparent window for allowing the machining area to be visually checked from the outside. The cover body can be formed to be of a sufficient strength throughout and, if an unexpected accident occurs, structures within the machining area can be reliably prevented from being shot out of the machining area.

1 Claim, 3 Drawing Sheets

(56) References Cited

U.S. PATENT DOCUMENTS

2017/0188416 A1* 6/2017 Beifuss ................ H05B 6/6414

FOREIGN PATENT DOCUMENTS

| | | | |
|---|---|---|---|
| EP | 1932618 B2 * | 2/2017 | ......... B23Q 11/0891 |
| JP | H03166037 A | 7/1991 | |
| JP | 05319738 A | 12/1993 | |
| JP | 1996294849 A | 11/1996 | |
| JP | 08323519 A | 12/1996 | |
| JP | 2005190102 A | 7/2005 | |
| JP | 2013176822 A | 9/2013 | |
| JP | 2015137812 A | 7/2015 | |
| WO | 2011019464 A1 | 2/2011 | |
| WO | 2015185632 A1 | 12/2015 | |

* cited by examiner

MACHINE TOOL PROVIDED WITH CAMERA FOR CAPTURING IMAGE OF TOOL INTERIOR

BACKGROUND

Field of the Disclosure

The present disclosure relates to a machine tool having a cover body for separating at least a machining area from the outside.

Background of the Disclosure

Conventionally, a cover body of a machine tool typically has an opening for allowing a machining area to communicate with the outside and includes a door for opening and closing the opening; the door is provided with a window made of transparent or translucent materials to allow the machining area to be visually checked from the outside.

Further, a hitherto known example of a cover body provided with such a window is the cover body disclosed in Japanese Unexamined Patent Application Publication No. H3-166037 (hereinafter "the '037 publication"). The cover body (specifically, a slide door) disclosed in the '037 publication is made of a plate-shaped polycarbonate and has a configuration in which a glass plate is attached to the inner side (machining area side) of a portion which is supposed to be a window.

According to this cover body, because the polycarbonate plate forming the cover body has a very high toughness and a high impact resistance, if an unexpected accident such as collision between a tool and a workpiece occurs due to, for example, an operation error or an error in program generation, the tool and the workpiece can be reliably prevented from being shot out of the machining area by the collision.

While a polycarbonate plate has a high toughness and a high impact resistance as described above, its hardness is not so high, that is, its wear resistance is not so high. Therefore, a polycarbonate plate has a disadvantage that, for example, when chips generated by cutting or the like hit its surface, the surface is shaven by the chips and thereby roughened, which impairs the transparency (visibility) through the roughened portion.

Therefore, in order to prevent the surface of the polycarbonate plate from being roughened by chips and allow the polycarbonate plate to maintain a good visibility, the above cover body employs a configuration in which a glass plate that has a high wear resistance is attached to the inner side (machining area side) of a portion which is supposed to be a window, of the polycarbonate plate.

Thus, according to the conventional cover body having the above-described configuration, the glass plate arranged on the machining area side can prevent the visibility of the window (observation from the outside) from being impaired by chips, and the polycarbonate plate having a high toughness and a high impact resistance can reliably prevent a tool and a workpiece from being shot out of the machining area, thereby ensuring a high safety.

By the way, recently, it has been found out that a polycarbonate plate has, besides the disadvantage of low wear resistance, a disadvantage that it has a low resistance to coolant and, if it is in contact with coolant for a long time, its high toughness and high impact resistance, which are its advantages, are reduced.

Therefore, at present, a cover body, except for a window, is made of sheet metal, and the window employs a configuration in which a glass plate and a polycarbonate plate are respectively arranged on the machining area side and the outer side and they are airtightly joined together with a certain distance between them.

According to the window having such a configuration, the polycarbonate plate can be prevented from being brought into contact with coolant, which prevents the toughness and impact resistance of the polycarbonate plate from being reduced by coolant.

SUMMARY OF THE DISCLOSURE

However, although this conventional window has been improved as described above and provides effects corresponding to the improvement, the glass plate arranged on the machining area side is easily broken even by receiving a small impact, because of its low toughness and low impact resistance. Depending on how the glass plate is broken, coolant or chips might enter the space between the glass plate and the polycarbonate plate through the broken portion and the toughness and impact resistance of the polycarbonate plate might be reduced by the influence of the entering coolant or chips.

Therefore, when the glass plate is broken, the window needs to be replaced with a new one soon because safety is a priority. However, the above conventional window is formed using an expensive material, which means a polycarbonate plate, and requires a troublesome manufacturing process in which a glass plate and a polycarbonate plate are respectively arranged on the machining area side and the outer side and they are airtightly joined together with a certain distance between them; therefore, the cost of manufacturing of the window per se is high. Further, such replacement requires the machine tool to be stopped; therefore, from an overall operational point of view, the above conventional window has a problem that it is likely to lead to increase in equipment cost and is likely to lead to increase in manufacturing cost due to reduced availability.

Furthermore, there is also a problem that, if coolant or chips enter the space between the plates through a broken portion of the glass plate, the entering coolant or chips adhere to the glass plate or the polycarbonate plate and thereby the visibility of the window is reduced, but the reduced visibility cannot be restored to an appropriate state because it is almost impossible to clean the space between the plates.

The present disclosure has been achieved in view of the above-described circumstances, and an object thereof is to provide a machine tool having a cover body which has a uniform strength throughout, and another object thereof is to provide a machine tool in which the state of a machining area can be checked from the outside while a cover body thereof has a uniform strength throughout.

The present disclosure, for solving the above-described problems, relates to a machine tool including a cover body for separating at least a machining area from an outside, the cover body having an opening for allowing the machining area to communicate with the outside and being configured to include a door for opening and closing the opening, the cover body not including a window for allowing the machining area to be visually checked from the outside.

The cover body of this machine tool is entirely made of a metallic material or another material having a predetermined strength and, if needed, resistance to coolant, and the cover body is not provided with a window for allowing the machining area to be visually checked from the outside. Therefore, the cover body can be formed to have a sufficient strength such that, if an unexpected accident such as collision between a tool and a workpiece occurs, the tool and the workpiece can be reliably prevented from being shot out of the machining area by the collision. Therefore, the frequency of occurrence of the need for replacement of the cover body due to occurrence of such an accident is much lower than that of the conventional cover body having a window composed of a glass plate and a polycarbonate plate. Accordingly, in the machine tool according to the present disclosure, unlike the conventional machine tool having the conventional window, the problems of increase in equipment cost and increase in manufacturing cost due to reduced availability do not arise.

The machine tool according to the present disclosure preferably further includes:

a camera disposed in an internal space defined by the cover body for capturing an image of the machining area; and a display disposed outside the cover body for displaying the image captured by the camera.

When the machining area is separated from the outside by the cover body in the above-described manner, the machining area cannot be checked from the outside, which may leads to a problem that an operator cannot take an appropriate action in response to the state of the machining area or such an action is delayed. However, according to the machine tool having the above-described configuration, an image of the machining area captured by the camera is displayed on the display; therefore, the operator can check the state of the machining area through an image displayed on the display and, if an action needs to be taken in response to the state of the machining area, the operator can take an appropriate action as appropriate.

Note that there is a possibility that the camera is broken by a collision accident as mentioned above or the like. However, cameras have become inexpensive in recent years; therefore, if the need for replacement of the camera arises, the cost of replacement of the camera can be kept low as compared with the cost of replacement of the conventional window. Further, the image might become unclear due to adhesion of coolant or the like to a lens of the camera; however, in such a case, the image can be restored to a clear state by removing the coolant or the like.

Further, the camera may be fixed to an inner side of the door and the display may be fixed to an outer side of the door. According to this configuration, an image in the direction from the door toward the machining area is captured by the camera and such an image is displayed on the display provided on the door. Therefore, by checking an image displayed on the display, the operator can check the state of the machining area as if he visually checked the machining area through a window provided on the door similarly to the conventional machine tool.

Further, the camera may be composed of a camera body and a support supporting the camera body, and the support may be configured to support the camera body in a manner such that the camera body is able to turn laterally and vertically. According to this configuration, the capturing direction of the camera body can be adjusted by causing the camera body to turn laterally and vertically, which enables a needed image to be displayed on the display as appropriate.

Further, the camera may include a turning mechanism for causing the camera body to turn laterally and vertically, and the machine tool may further include an operating device disposed outside the cover body for operating the turning mechanism. In this configuration, the capturing direction of the camera body can be easily adjusted with the operating device.

As described above, in the machine tool according to the present disclosure, the cover body is entirely made of a metallic material or another material having a predetermined strength and, if needed, resistance to coolant, and the cover body is not provided with the conventional window; therefore, the cover body can be formed to have a sufficient strength. Therefore, according to this machine tool, the frequency of occurrence of the need for replacement of the cover body due to a collision accident as mentioned above or the like can be made much lower than that of the conventional cover body; consequently, unlike the conventional machine tool, the problems of increase in equipment cost and increase in manufacturing cost due to reduced availability do not arise.

Further, in the configuration in which a camera is disposed in an internal space defined by the cover body, and an image of the machining area is captured by the camera and the captured image is displayed on a display disposed outside the cover body, the operator can check the state of the machining area through an image displayed on the display and, if an action needs to be taken in response to the state of the machining area, the operator can take an appropriate action as appropriate.

Further, in the configuration in which the camera is fixed to an inner side of the door and the display is fixed to an outer side of the door, an image in the direction from the door toward the machining area can be displayed on the display; therefore, by checking an image displayed on the display, the operator can check the state of the machining area as if he visually checked the machining area through a window provided on the door.

Further, in the configuration in which the camera is composed of a camera body and a support supporting the camera body and the camera body is configured to be able to turn laterally and vertically, the capturing direction of the camera body can be adjusted, which enables a needed image to be displayed on the display as appropriate. Further, in the configuration in which a turning mechanism is provided for causing the camera body to turn laterally and vertically and the turning mechanism is operated with an operating device provided outside the cover body, the capturing direction of the camera body can be easily adjusted.

DETAILED DESCRIPTION

Figure 1:
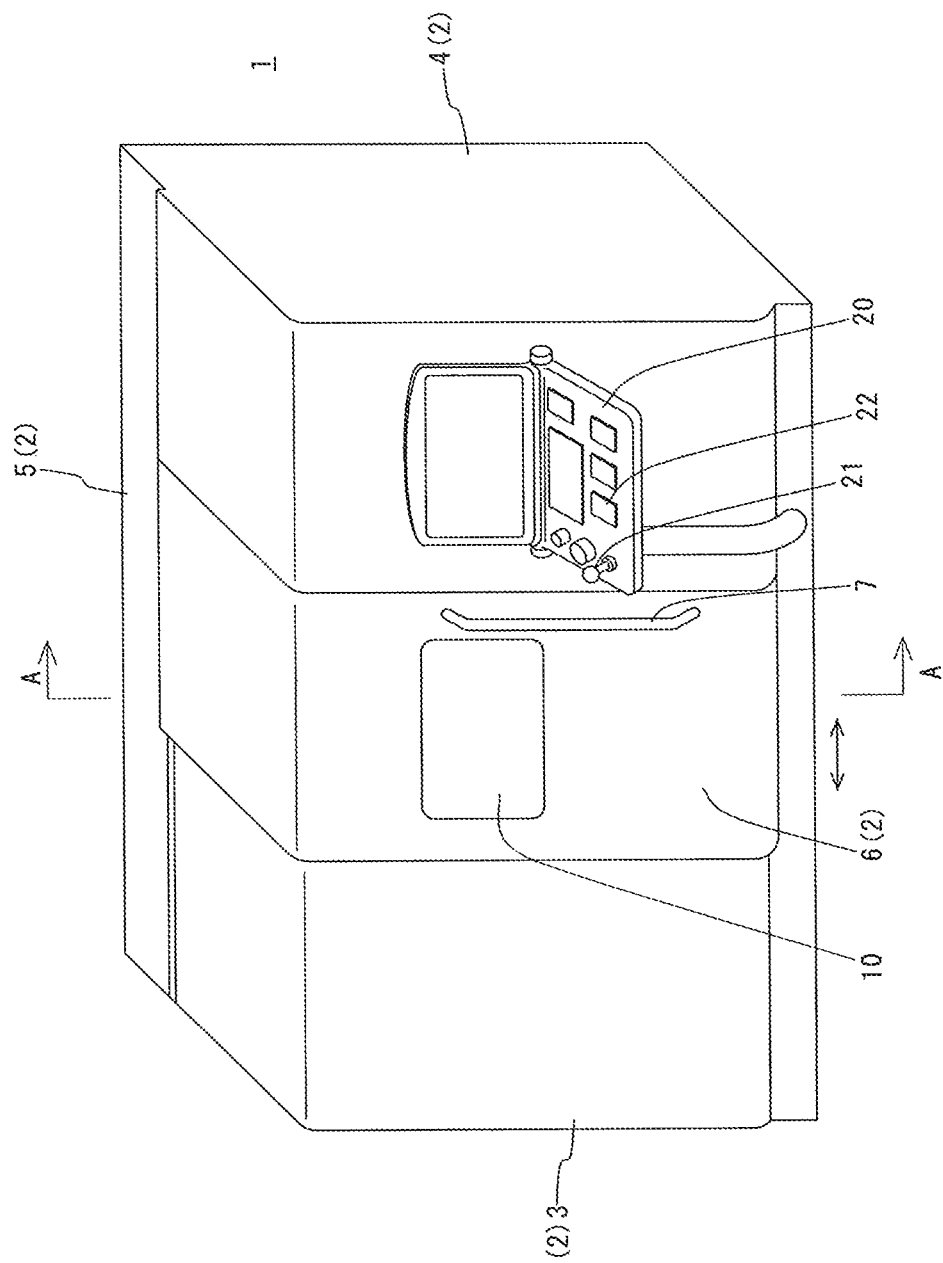
FIG. 1 is a perspective view of a machine tool according to an embodiment of the present disclosure.
Figure 2:
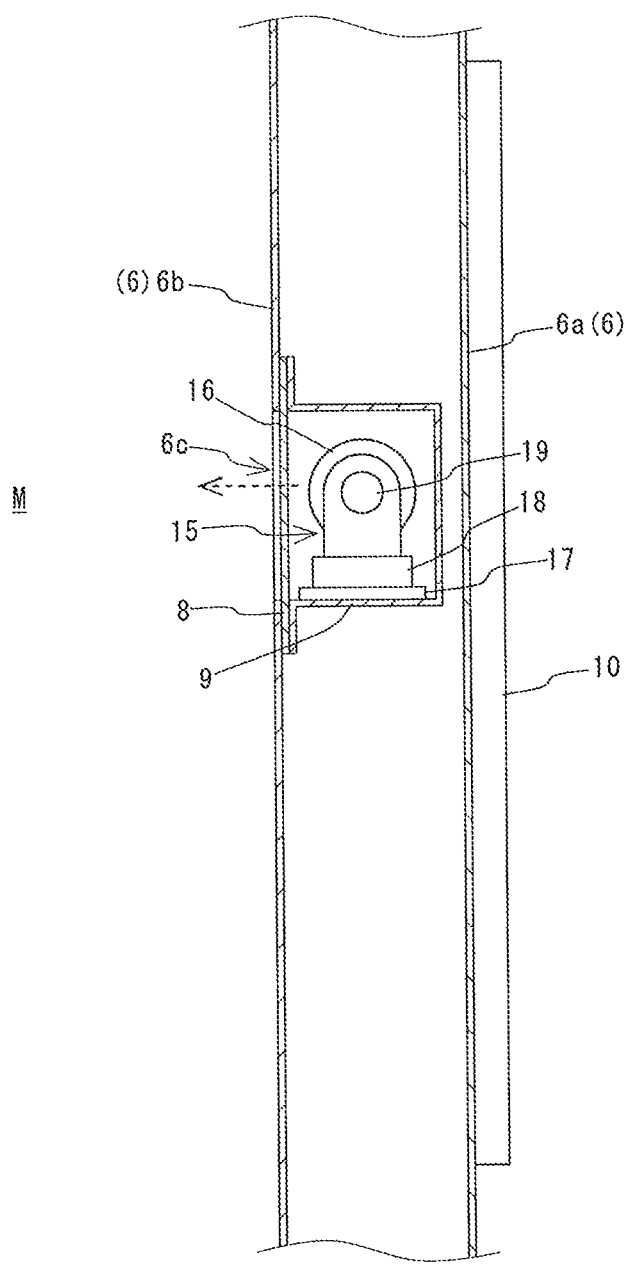
FIG. 2 is a sectional view of a door shown in FIG. 1, taken along arrows A-A in FIG. 1.
Figure 3:
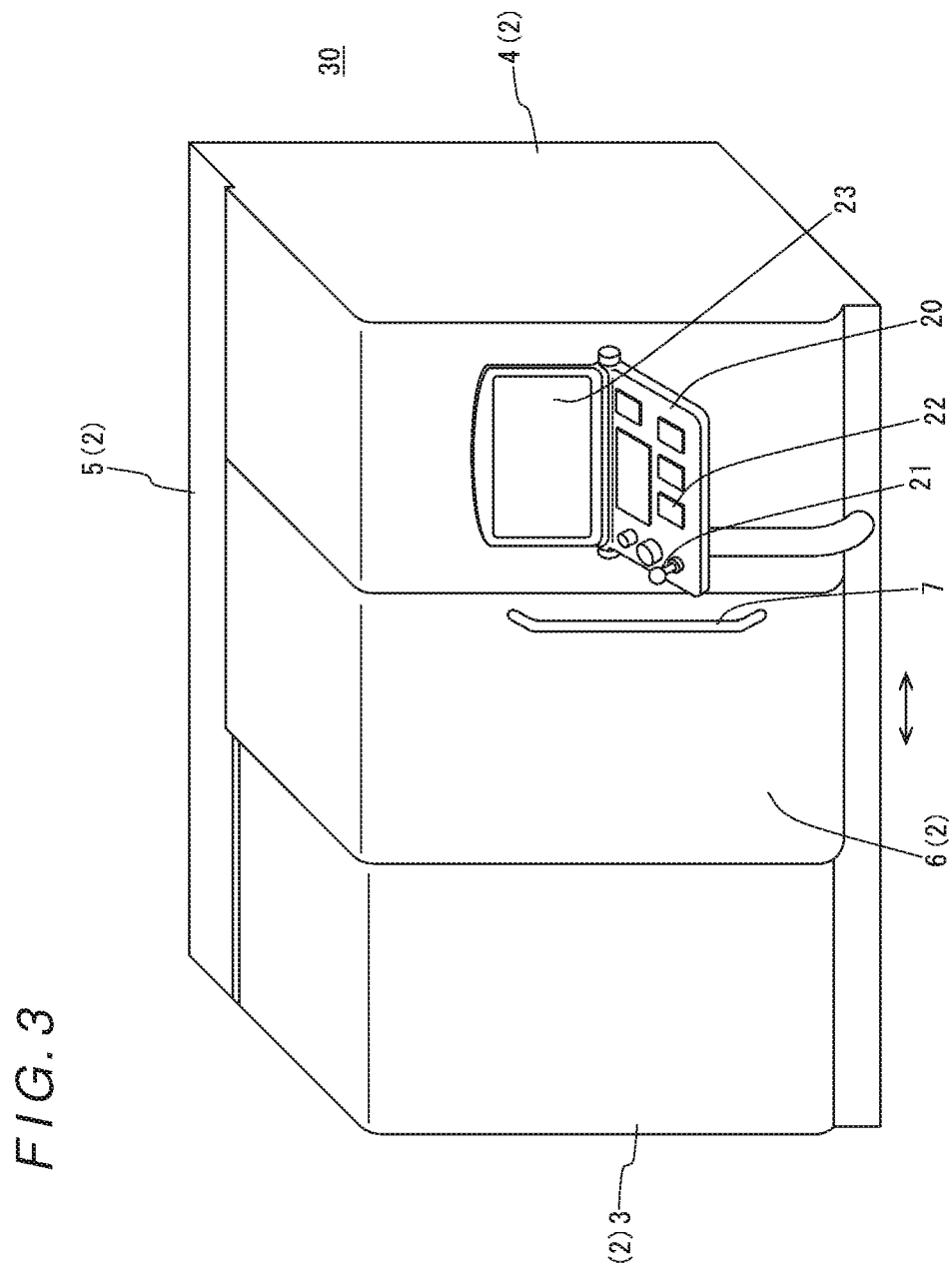
FIG. 3 is a perspective view of a machine tool according to another embodiment of the present disclosure.

Hereinafter, a specific embodiment of the present disclosure will be described below with reference to the drawings. FIG. 1 is a perspective view of a machine tool according to an embodiment of the present disclosure and FIG. 2 is a sectional view of a door shown in FIG. 1, taken along the arrows A-A in FIG. 1.

As shown in FIG. 1, the machine tool 1 according to this embodiment is specifically an NC lathe and has a configuration in which structures such as a bed, a headstock, a tool rest, and the like, which are not shown in the drawings, are covered by a cover body 2. The cover body 2 is composed of a left fixed cover 3 that mainly covers a left area, a right fixed cover 4 that mainly covers a right area, a rear fixed cover 5 that mainly covers the rear and the rear side of the top, and a door cover 6 that covers an opening between the left fixed cover 3 and the right fixed cover 4.

Each of the left fixed cover 3, right fixed cover 4, rear fixed cover 5, and door cover 6 is made of a metal plate and none of them is provided with the above-described conventional window.

The door cover 6 is provided to be slidable in the direction indicated by the arrow, that is, in the lateral direction. In this embodiment, sliding the door cover 6 leftward causes the opening between the left fixed cover 3 and the right fixed cover 4 to be opened, so that a machining area communicates with the outside. Correspondingly, sliding the door cover 6 rightward causes the opening between the left fixed cover 3 and the right fixed cover 4 to be closed, so that the machining area is isolated from the outside. Note that reference numeral 7 indicates a handle for sliding the door cover 6.

Further, as shown in FIG. 2, the door cover 6 is composed of an outer plate member (outer member) 6a and an inner plate member (inner member) 6b, which are arranged in parallel with an appropriate distance between them. A display 10 is fixed to an outer surface of the outer member 6a, which is the front of the outer member 6a, and a camera 15 is fixed to the inner member 6b behind the display 10. Note that the display 10 may employ a typical liquid crystal display; however, the display 10 is not limited thereto and may be any display as long as it is capable of displaying an image.

As shown in FIG. 2, the inner member 6b has an opening 6c formed in a portion thereof at which the camera 15 is disposed, and the opening 6c is closed on the outer member 6a side by a casing 9 having an opening on the opening 6c side, with a transparent member 8 between them. Further, the camera 15 is disposed within the casing 9. Note that there is no restriction on the transparent member 8 as long as it is a transparent member having a certain level of strength; examples of the transparent member 8 include a glass plate and a transparent resin plate.

The camera 15 is composed of a camera body 16 that captures an image of the machining area M through the opening 6c and the transparent member 8, and a support 17 that supports the camera body 16. The support 17 includes a lateral turning mechanism 18 that causes the camera body 16 to turn laterally, that is, on a vertical axis, and a vertical turning mechanism 19 that causes the camera body 16 to turn vertically, that is, on a horizontal axis (axis perpendicular to the drawing sheet surface).

The lateral turning mechanism 18 and the vertical turning mechanism 19 are configured to be operated with an operating lever 21 provided on an operation panel 20 for operating the machine tool 1. When an operator operates the operating lever 21, the lateral turning mechanism 18 and the vertical turning mechanism 19 operate in response to the operation of the operating lever 21, such that the camera body 16 turns laterally and vertically to change the capturing direction of the camera body 16. Note that the operating lever 21 may employ a so-called joystick.

Further, the camera 15 includes a zooming mechanism; the zooming mechanism is operated with operation keys 22 that are also provided on the operation panel 20. A captured image can be scaled up or down by operating a corresponding operation key 22.

Further, an image of the machining area M captured by the camera 15 is transmitted to the display 10 via an appropriate processor, which is not shown in the drawings; an image that has been processed by the processor (not shown) is displayed on the display 10.

Note that the camera 15 may be any camera as long as it is capable of capturing a video image; the camera 15 may employ a typical web camera, a typical surveillance camera, or the like.

In the machine tool 1 according to this embodiment having the above-described configuration, an image of the machining area M captured by the camera 15 is displayed on the display 10 provided on the door cover 6. In this machine tool 1, the operator cannot check the state of the machining area M through a window because the door cover 6 is not provided with the conventional window. Instead, however, by checking an image displayed on the display 10, the operator can check the state of the machining area M as if he visually checked the machining area M through a window provided on the door cover 6 similarly to the conventional machine tool.

Further, because the operator checks the state of the machining area M in the above-described manner, if an action needs to be taken in response to the state of the machining area M, he can take an appropriate action as appropriate.

Further, the operator can easily adjust the capturing direction of the camera 15 by operating the operating lever 21 provided on the operation panel 20 and can easily scale up or down the image by operating the operation keys 22; therefore, the operator can exactly display an image which he desires on the display 10 and check the image.

Further, in the machine tool 1 according to this embodiment, the cover body 2 is entirely made of a metallic material and the cover body 2 is not provided with a transparent window for allowing the machining area M to be visually checked from the outside. Therefore, with the cover body 2 being formed to have a sufficient strength, if an unexpected accident such as collision between a tool and a workpiece occurs, the tool and the workpiece can be reliably prevented from being shot out of the machining area M by the collision. Further, in this machine tool 1, the frequency of occurrence of the need for replacement of the cover body 2 due to occurrence of such an accident is much lower than that of the conventional cover body having a window composed of a glass plate and a polycarbonate plate. Therefore, unlike the conventional machine tool, the problems of increase in equipment cost and increase in manufacturing cost due to reduced availability do not arise.

Note that there is a possibility that the camera 15 or the transparent member 8 is broken by a collision accident as mentioned above or the like. However, the camera 15 has become inexpensive in recent years and the transparent member 8 may be an inexpensive one; therefore, if the need for replacement of the camera 15 or the transparent member 8 arises, the cost of replacement thereof can be kept low as compared with the cost of replacement of the conventional window. Further, the image might become unclear due to adhesion of coolant or the like to the transparent member 8; however, in such a case, the image can be restored to a clear state by removing the coolant or the like.

Thus, one specific embodiment of the present disclosure has been described above; however, the present disclosure is not limited thereto and may be implemented in other modes.

For example, the display 10 is provided on the door cover 6 in the above embodiment; however, the present disclosure is not limited to such a configuration and, as shown in FIG.

3, a configuration is possible in which the display 10 is not provided. In this case, an image captured by the camera 15 may be displayed on a display 23 of the operation panel 20. Also in this configuration, the operator can check the state of the machining area M through an image displayed on the display 23.

In the case where the display 10 is not provided, although it is disadvantageous that the state of the machining area M cannot be checked from the outside at all, a configuration is possible in which the camera 15 is not provided.

Further, the camera 15 is provided on the inner member 6b of the door cover 6 in the above embodiment; however, the present disclosure is not limited to such a configuration and a configuration is possible in which the camera 15 is arranged at an appropriate position within the machining area M. Also in this configuration, the operator can check the state of the machining area M through an image displayed on the display 10 or the display 23.

Further, the lateral turning mechanism 18 and the vertical turning mechanism 19 are configured to be operable with the operating lever 21 and the operation keys 22 in the above embodiment; however, the present disclosure is not limited to such a configuration. Although ease of use is reduced, a configuration is possible in which the lateral turning mechanism 18 and the vertical turning mechanism 19 are directly manually operated, or alternatively a configuration is possible in which the lateral turning mechanism 18 and the vertical turning mechanism 19 are not provided.

Further, the cover body subject to provision of no window is a cover body which separates a machining area from the outside; other cover bodies may be provided with a window.

Further, the material of the left fixed cover 3, right fixed cover 4, rear fixed cover 5, and door cover 6 is not limited to metallic materials, and any material may be used as long as it has a predetermined strength and, if needed, resistance to coolant. By way of example, CFRP may be used. Further, these covers may be made of different materials.

Further, an image of the machining area M captured by the camera 15 may be transmitted to a device located at a position away from the machine tool 1, such as a computer in an office or a portable information terminal, via the processor (not shown) and displayed on a display of the device. In this configuration, the state of the machining area M of the machine tool 1 can be checked remotely, which improves convenience for maintenance or the like.

What is claimed is:

1. A machine tool, including:
    a cover body for separating at least a machining area from an outside; and
    an operation panel having a first display,
    the cover body having an opening for allowing the machining area to communicate with the outside and being configured to include a door for opening and closing the opening,
    the cover body not including a window for allowing the machining area to be, visually checked from the outside,
    the door comprising an outer member and an inner member, the outer and inner members being arranged in parallel with a predetermined distance between them,
    the machine tool further including:
        a transparent member disposed in a space between the inner member and the outer member and closing an opening formed in the inner member from an outer member side;
        a casing disposed in the space between the inner member and the outer member and having an opening on an inner member side, the casing being fixed to the inner member with the transparent member being interposed therebetween in a manner such that the opening of the casing is in contact with the transparent member and the transparent member is clamped by the casing and the inner member;
        a camera disposed within the casing for capturing an image of the machining area through the opening of the casing, the transparent member, and the opening of the inner member; and
        a second display disposed on an outer surface of the outer member for displaying the image captured by the camera,
    the camera being disposed within the casing and comprising:
        a camera body;
        a support supporting the camera body in a manner such that the camera body is able to turn laterally and vertically; and
        a turning mechanism manually operated from the outside to cause the camera body to turn laterally and vertically,
    the machine tool further including an operating device provided on the operation panel for manually operating the turning mechanism,
    the second display being fixed to the outer surface of the outer member corresponding to a front of the outer member
    the first display and the second display being arranged at a same height position,
    the opening of the inner member and the opening of the casing being set to have a same size allowing the camera body to capture the image in a capturing direction adjusted by causing the camera body to turn laterally and vertically.

* * * * *